United States Patent
Mahasenan et al.

(10) Patent No.: US 9,877,219 B2
(45) Date of Patent: *Jan. 23, 2018

(54) WIRELESS NETWORK SITE SURVEY SYSTEMS AND METHODS

(71) Applicant: Honeywell International Inc., Morris Plains, NJ (US)

(72) Inventors: Arun Vijayakumari Mahasenan, Hopkins, MN (US); Alexander Chernoguzov, Warrington, PA (US); Todd Bill, Morristown, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/286,757

(22) Filed: Oct. 6, 2016

(65) Prior Publication Data

US 2017/0026864 A1 Jan. 26, 2017

Related U.S. Application Data

(62) Division of application No. 13/739,507, filed on Jan. 11, 2013, now Pat. No. 9,491,639.

(51) Int. Cl.
*H04W 24/10* (2009.01)
*H04W 16/20* (2009.01)
*H04W 24/00* (2009.01)
*H04W 84/18* (2009.01)

(52) U.S. Cl.
CPC .......... *H04W 24/10* (2013.01); *H04W 16/20* (2013.01); *H04W 24/00* (2013.01); *H04W 84/18* (2013.01)

(58) Field of Classification Search
CPC ..... H04W 24/00; H04W 16/20; H04W 24/10; H04W 36/0083; H04W 36/32
See application file for complete search history.

(56) References Cited

U.S. PATENT DOCUMENTS

| | | |
|---|---|---|
| 7,162,507 B2 | 1/2007 | Carter |
| 7,567,822 B2 | 7/2009 | Hart et al. |
| 2004/0260808 A1 | 12/2004 | Strutt |
| 2005/0032531 A1 | 2/2005 | Gong et al. |

(Continued)

FOREIGN PATENT DOCUMENTS

| | | |
|---|---|---|
| WO | 9911081 | 3/1999 |
| WO | 2011144795 | 6/2013 |

OTHER PUBLICATIONS

Haidar Nail Mahmoud, "Wireless Site Survey", Nov. 2010, (unpublished Bachelor's thesis in Electronic Engineering, University College of Gävle), (46 pages).

*Primary Examiner* — Anez Ebrahim
(74) *Attorney, Agent, or Firm* — Brooks, Cameron & Huebsch, PLLC (57) ABSTRACT

Wireless network site survey systems and methods are described herein. One system includes a plurality of wireless nodes placed at a number of locations and a computing device configured to: receive communication metrics, wherein the communication metrics include metrics of communication between the plurality of wireless nodes and between the computing device and each of the plurality of wireless nodes, and generate a node coverage map based on the received communication metrics.

20 Claims, 3 Drawing Sheets

(56) References Cited

U.S. PATENT DOCUMENTS

| | | | |
|---|---|---|---|
| 2007/0082677 A1* | 4/2007 | Donald Hart | H04W 16/18 455/456.1 |
| 2008/0225809 A1* | 9/2008 | Guo | H04W 40/246 370/338 |
| 2009/0054043 A1 | 2/2009 | Hamilton et al. | |
| 2009/0253436 A1 | 10/2009 | Nientiedt | |
| 2009/0265143 A1 | 10/2009 | Kaufman et al. | |
| 2010/0074141 A1* | 3/2010 | Nguyen | H04L 41/12 370/254 |
| 2011/0143794 A1 | 6/2011 | Nientiedt | |
| 2013/0107728 A1* | 5/2013 | Zhu | H04W 64/006 370/252 |

* cited by examiner

WIRELESS NETWORK SITE SURVEY SYSTEMS AND METHODS

CROSS-REFERENCE TO RELATED APPLICATIONS

This application is a divisional of U.S. patent application Ser. No. 13/739,507, filed Jan. 11, 2013, the entire contents of which are hereby incorporated by reference.

TECHNICAL FIELD

The present disclosure relates to wireless network site survey systems and methods.

BACKGROUND

Particular wireless network surveying techniques can be used to determine a number of qualities of a wireless network. Some surveying techniques can include installation of an operational wireless network and performing various surveying technique. Other surveying techniques can include measuring qualities of a single link between a wireless node and a computing device at various locations within an area to be surveyed.

DETAILED DESCRIPTION

Wireless network site survey systems and methods are described herein. For example, one or more embodiments include placing a number of wireless nodes a first set of locations, placing a root access point at a particular location in communication with at least one of the number of wireless nodes, receiving communication metrics from the number of wireless nodes at the first set of locations and the root access point, moving the number of wireless nodes to a second set of locations that is in communication with the root access point at the particular location, receiving communication metrics from the number of wireless nodes at the second set of locations and the root access point, and generating a node coverage map based on the received communication metrics, wherein the node coverage map includes the first and second set of locations.

A wireless network site survey can be used to determine a number of communication metrics (e.g., connection qualities, received signal strength indication (RSSI), link quality indicator (LQI), received signal quality indicator (RSQI), etc.) for a wireless network (e.g., computer network, telecommunication network, local area network (LAN), wide area network (WAN), etc.). The wireless network site survey can be performed prior to installation of the wireless network by placing a plurality of wireless nodes at a number of locations. The wireless nodes can include a free router (e.g., wireless communication device, etc.) configured to send and/or receive a number of beacon messages to a computing device and/or other wireless nodes.

The wireless nodes can be place throughout a particular area to determine a number of communication metrics for wireless network to be installed in the particular area. The wireless nodes can communicate with each other to determine a number of communication metrics between each of the wireless nodes and can communicate with a computing device to determine a number of communication metrics between the computing device and the wireless nodes. The computing device can use the number of communication metrics to generate a wireless node map and/or heat map for the particular area. The wireless node map and/or heat map can be used to determine wireless routing device locations for installing a wireless network.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of wireless nodes" can refer to one or more wireless nodes.

Figure 1:
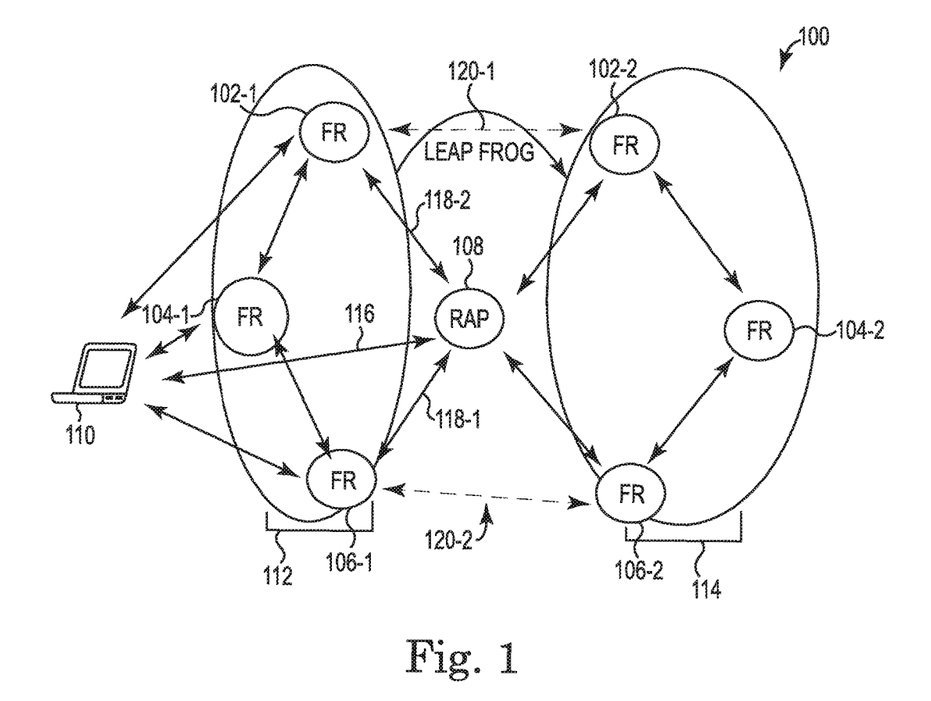
FIG. 1 illustrates an example of a wireless network site survey system in accordance with one or more embodiments of the present disclosure.

FIG. 1 illustrates an example of a wireless network site survey system 100 in accordance with one or more embodiments of the present disclosure. The wireless network site survey can include a number of wireless nodes (e.g., wireless nodes 102-1, 104-1, 106-1, etc.) placed at a number of locations. The number of wireless nodes can be placed at a number of locations that can enable each of the number of the wireless nodes to be in communication with a number of other wireless nodes. For example, wireless node 104-1 can be placed at a particular location that is close enough to enable wireless node 104-1 to communicate (e.g., send and/or receive beacon messages, etc.) with wireless node 102-1.

The distance and/or position between two wireless nodes can be different depending on a number of factors (e.g., type of wireless node, objects between wireless nodes that can cause interference, etc.). The number of factors can include a number of properties of the wireless nodes (e.g., signal strength, etc.) and/or a number of properties of the area (e.g., wall positions, materials within structure, etc.) being surveyed. For example, two wireless nodes can be placed at a greater distance if the signal strength of the two wireless nodes is greater compared to two wireless nodes with a lower signal strength.

Each of the number of wireless nodes can communicate (e.g., send and/or receive beacon messages, etc.) with a computing device 110. For example, wireless node 108 can communicate with wireless node 102-1 and/or wireless node 106-1. The number of wireless nodes can communicate by sending and receiving a number of beacon messages (e.g., advertisements, message including information relating to the sending wireless node, etc.).

The number of beacon messages can be analyzed by the computing device 110 and/or the receiving wireless node to determine communication metrics between the sending wireless node and the receiving wireless node. For example, a beacon message can be sent from wireless node 106-1 to wireless node 108 via communication path 118-1. The received beacon message can be analyzed by wireless node 108 and/or sent to computing device 110 via communication path 116 to be analyzed by computing device 110.

Beacon messages can be sent and received between the wireless nodes and the computing device 110. For example, beacon messages can be sent from wireless node 102-1 to the computing device 110. The computing device 110 can determine a number of communication metrics of the wireless nodes based on the sending and receiving of beacon messages between the wireless nodes and the computing device 110. For example, the computing device 110 can determine a number of communication metrics between the computing device 110 and wireless node 108 through communication via a wireless connection 116. The communication in this example can include the sending and receiving of beacon messages similar to the sending and receiving of beacon messages between the number of wireless nodes.

The communication between the computing device 110 and the number of wireless nodes can include information about communication metrics between the number of wireless nodes. For example, communication sent from wireless node 108 to the computing device 110 can include a number of communication metrics between wireless node 108 and wireless node 102-1. That is, the communication metrics can be determined by each of the wireless nodes and the determined communication metrics can be sent to the computing device 110.

The communication metrics can include a number of metrics that can indicate a link quality between the sending wireless node and the receiving wireless node. For example, metrics that can indicate a link quality can include: RSSI, LQI, RSQI, among other metrics to evaluate a link quality between the sending wireless node and the receiving wireless node.

The communication metrics between a number of wireless nodes and communication metrics between a number of wireless nodes and the computing device 110 can be used to generate a wireless node coverage map of a first area 112. The wireless node coverage map can include communication metrics for the first area 112. For example, the wireless node coverage map can include potential link quality within the first area 112.

One of the number of wireless nodes can be a root access point (RAP) and/or a master wireless node. The RAP can be a wireless node that can be used to leap frog the remaining wireless nodes to a second area 114. A leap frog can include placing the remaining wireless nodes (e.g., nodes other than the RAP, etc.) to a second location within the area that is desired to be surveyed.

The RAP can be wireless node 108. That is, wireless node 102-1, wireless node 104-1 and wireless node 106-1 can be moved to a second location. The second location for each node can be represented by wireless node 102-2, wireless node 104-2, and wireless node 106-2. The RAP wireless node 108 can remain in the same location. The RAP wireless node 108 can communicate with a number of nodes at the second location. For example, the RAP wireless node 108 can communicate (e.g., send and/or receive beacon messages, etc.) with wireless node 102-2 and/or wireless node 106-2. Similarly, wireless node 104-2 in the second position can communicate with wireless node 106-2 and wireless node 102-2 in the second position.

The wireless nodes at the second location can communicate with the computing device 110 (e.g., portable computing device capable of moving through a particular area, etc.). The communication between the wireless nodes at the second location and the computing device 110 can be similar to the communication between the wireless nodes at the first position and the computing device 110 as described herein. For example, the computing device 110 can communicate with the RAP wireless node 108 via communication path 116. In addition, the computing device 110 can communicate with wireless node 106-2, wireless node 104-2, and/or wireless node 102-2.

The communication between each of the wireless nodes and the computing device 110 can include the sending and/or receiving of a number of beacon messages. The beacon messages can include a number of communication metrics between the computing device 110 and each of the number of wireless nodes. For example, the computing device 110 can communicate by sending and/or receiving a number of beacon messages with wireless node 104-2. The computing device 110 can determine a number of communication metrics based on the number of received and/or sent beacon messages.

The number of beacon messages sent by the number of wireless nodes to the computing device 110 can include communication metrics for a link quality between the number of wireless nodes. For example, a link quality can be determined by RAP wireless node 108 based on communication with wireless node 102-2 and sent through a beacon message to the computing device 110. The computing device can receive the beacon message from the RAP wireless node 108 and utilize the link quality between the RAP wireless node 108 and wireless node 102-2 in surveying the communication metrics for area 114.

The computing device 110 can utilize the received beacon messages from the number of wireless nodes and the received communication metrics between each of the number of wireless nodes to determine a projected communication between the wireless nodes at the first position and the wireless nodes at the second position. For example, the computing device 110 can utilize the communication metrics to determine a projected communication 120-1 between wireless node 102-1 at the first position and wireless node 102-2 at the second position. In this example, wireless node 102-1 can be the same physical node as wireless node 102-2. For example, a physical wireless node 102-1 can be placed at a particular first location for a determination of the communication metrics at the first position and the wireless node 102-1 can be moved (e.g., leap frog over RAP wireless node 108, etc.) and be a physical wireless node 102-2 at a second position for a determination of communication metrics at the second position.

Similarly, wireless node 106-1 can be moved to a second location and be wireless node 106-2. The projected communication 120-2 can be determined by the computing device 110 based on communication metrics of the first location and the second location of the wireless nodes.

By utilizing a plurality of wireless nodes placed at a number of locations within proximity to communicate with each other as described herein, a total area can be surveyed by measuring communication metrics for a number of areas within the total area and combining the number of areas to determine communication metrics for the total area. From the survey of area 112 and area 114 a wireless node coverage map can be generated that includes area 112 and area 114.

The wireless node coverage map can be used to determine node locations for installing a wireless network. The wireless node coverage map can be generated by moving the computing device 110 to a number of different locations within area 112 and area 114 and determining communication metrics at each of the number of locations. The leap frog as described herein can be accomplished utilizing the computing device 110 within area 112 when the wireless nodes are placed within area 112 and moving to locations within area 114 when the wireless nodes are leap frogged to locations within area 114.

Figure 2:
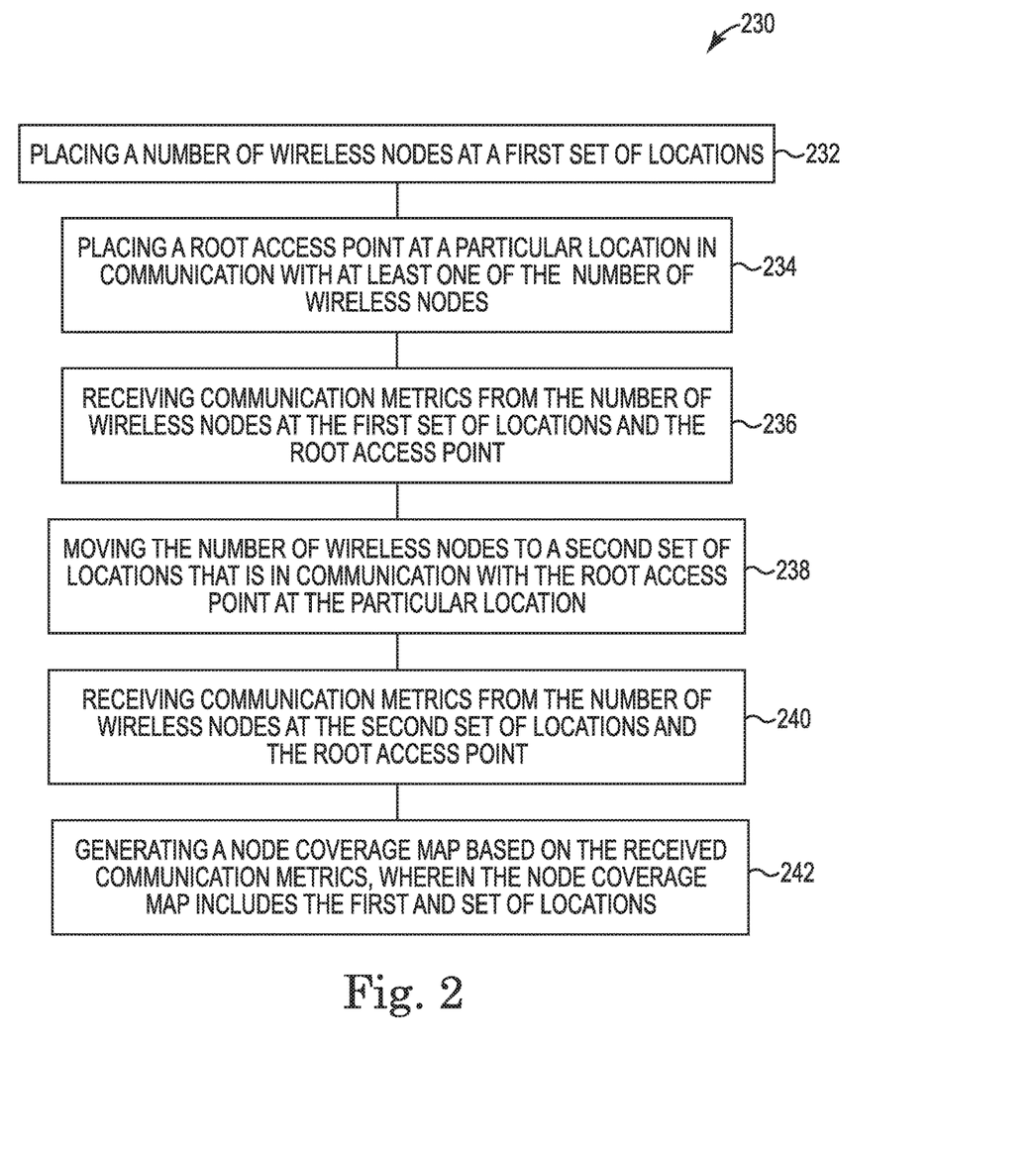
FIG. 2 illustrates an example method for a wireless network site survey in accordance with one or more embodiments of the present disclosure.

FIG. 2 illustrates an example method 230 for a wireless network site survey in accordance with one or more embodiments of the present disclosure. The method 230 can be utilized to survey a total area that includes a plurality of areas (e.g., a first area and a second area, etc.). A survey can include determining a number of communication metrics for the total area. For example, the number of communication metrics can include a link quality for a number of positions within the total area. The link quality, as described herein, can include various quality measurements (e.g., connection qualities, RSSI, LQI, RSQI, etc.) for a wireless network (e.g., computer network, telecommunication network, local area network (LAN), wide area network (WAN), etc.) of a wireless network.

At block 232, method 230 includes placing a number of wireless nodes at a first set of locations. The number of wireless nodes can include nodes that are capable of sending and/or receiving wireless messages. For example, the number of wireless nodes can be free routers capable of sending and receiving a number of beacon messages. The number of wireless routers can be placed at the first set of locations that enable the number of wireless routers to each communicate with other wireless routers. For example, a first wireless node can be placed at a first location that can communicate (e.g., send and receive beacon messages, etc.) with a second wireless node placed at a second location.

At block 234, method 230 includes placing a root access point (RAP) at a particular location in communication with at least one of the number of wireless nodes. The RAP can be a wireless node similar to the number of wireless nodes placed at the first set of locations. The RAP can be a stationary wireless node through a number of movements of the number of wireless nodes during the surveying method 230.

At block 236, method 230 includes receiving communication metrics from the number of wireless nodes at the first set of locations and the root access point. Receiving communication metrics can include sending and/or receiving a number of beacon messages between the number of wireless nodes. The sending and/or receiving the number of beacon messages between the number of wireless nodes can be used to determine communication metrics between the number of wireless nodes.

As described herein, the communication metrics that are determined based on the communication between the number of wireless nodes can be used to determine a node coverage map (e.g., representation of link quality for particular locations within the particular area, etc.) for a particular area. For example, communication metrics between each of the number of wireless nodes and communication metrics between the wireless nodes and a computing device can be used to determine a node coverage map for the first location. In another example, a computing device can be moved to an area surrounding each of the number of wireless nodes to determine a number of communication metrics between the computing device and each of the number of nodes. The computing device can utilize the communication metrics to generate a node coverage map that can be represented and displayed on the computing device as a heat map.

At block 238, method 230 includes moving the number of wireless nodes to a second set of locations that is in communication with the root access point at the particular location. Moving the number of wireless nodes to a second set of locations can be done to generate a node coverage map that includes area around the second set of locations. Moving the number of wireless nodes to the second set of locations can include moving the physical wireless nodes to the second set of locations.

At block 240, method 230 includes receiving communication metrics from the number of wireless nodes at the second set of locations and the root access point. Receiving communication metrics from the number of wireless nodes can include determining the communication metrics by analyzing sent and received beacon messages between the number of wireless nodes and between the number of wireless nodes and a computing device.

Each of the number of wireless nodes at the second set of locations can send communication metrics to the computing device. For example, communication metrics can be determined between a first wireless node and a second wireless node. In this example, the determined communication metrics can be sent to the computing device by the first wireless node and/or the second wireless node via a number of beacon messages. In the same example, communication metrics between the computing device and number of nodes can be determined from the sending and receiving of the number of beacon messages. That is, each of the number of wireless nodes can broadcast communication metrics with each of a number of surrounding wireless nodes. In this example, the computing device can receive communication metrics and/or a link quality for each of the wireless nodes when communicating with a single wireless node.

The computing device can be a portable computing device that can be moved to various locations within the first set of location and second set of locations to determine communication metrics between the computing device at the various locations and each of the number of wireless nodes. For example, a user can move the computing device throughout a first area that includes the first set of locations to determine communication metrics for each of the number of wireless nodes at various locations. In this example, the computing device can receive communication metrics for communication between the computing device and each of the number of wireless nodes as well as communication metrics for communication between each of the number of wireless nodes.

The number of beacon messages can be sent periodically over a fixed channel. For example, the number of beacon messages can be sent by the number of wireless nodes over a predetermined wireless channel. The predetermined wireless channel can include a particular wireless signal. The particular wireless signal can be wireless signal that can be used when installing an operating wireless network.

At block 242, method 230 includes generating a node coverage map based on the received communication metrics, wherein the node coverage map includes the first and second set of locations. The received communication metrics from the number of wireless nodes can be used to generate the node coverage map. The node coverage map can include a heat map that can represent communication metrics for an area that includes the first location and the second location. The heat map can be a graphical representation of the various communication metrics for an area surrounding the first location and the second location.

The node coverage map can be used to determine a number of physical locations within the area for a number of wireless routing devices for the installation of a wireless network for the area. For example, the node coverage map can be used to determine locations for the number of wireless routing devices based on the communication metrics between the number of wireless nodes and between the computing device and each of the number of wireless nodes. In this example, the node coverage map can be displayed and it can be used to determine that optimal communication metrics that can be achieved for the installation of the wireless network by placing the wireless routers at a number of specific locations.

Figure 3:
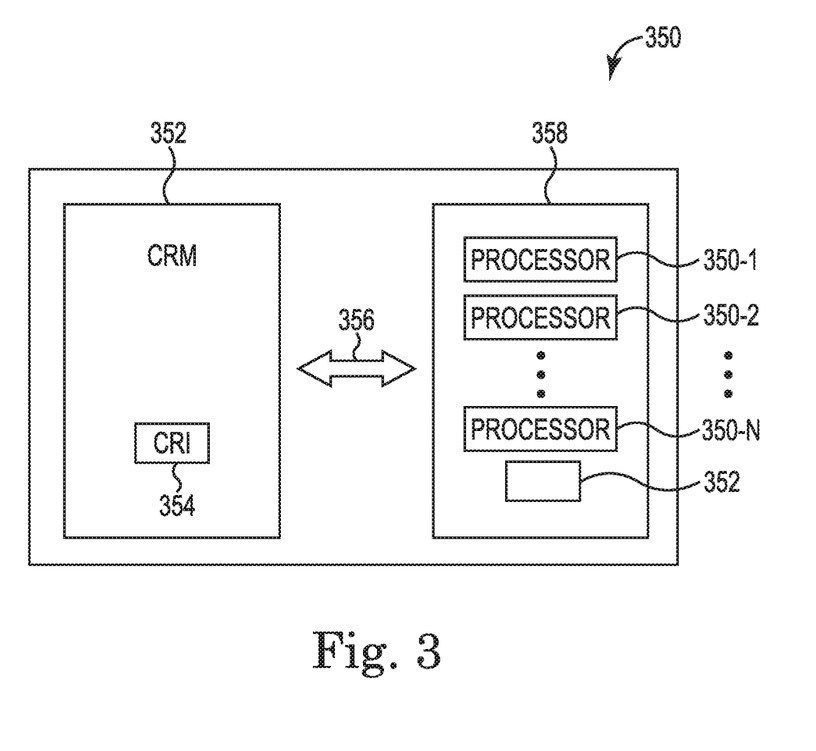
FIG. 3 illustrates a block diagram of an example of a computing device in accordance with one or more embodiments of the present disclosure.

FIG. 3 illustrates a block diagram of an example of a computing device 350 in accordance with one or more embodiments of the present disclosure. The computing device 350 can be a portable computing device (e.g., hand held computing device, laptop, etc.). The computing device 350 can include a communication interface (e.g., wireless network interface controller, IEEE 802.11 adapters, etc.) for receiving wireless data from a number of wireless nodes. The communication interface can be integrated in the computing device 350 and/or be an external card.

The computing device 350, as described herein, can also include a computer readable medium (CRM) 352 in communication with processing resources 350-1, 350-2, ..., 350-N. CRM 352 can be in communication with a device 358 (e.g., a Java® application server, among others) having processor resources 350-1, 350-2, ..., 350-N. The device 358 can be in communication with a tangible non-transitory CRM 352 storing a set of computer-readable instructions (CRI) 354 (e.g., modules) executable by one or more of the processor resources 350-1, 350-2, ..., 350-N, as described herein. The CRI 354 can also be stored in remote memory managed by a server and represent an installation package that can be downloaded, installed, and executed. The device 358 can include memory resources 352, and the processor resources 350-1, 350-2, ..., 350-N can be coupled to the memory resources 352.

Processor resources 350-1, 350-2, ..., 350-N can execute CRI 354 that can be stored on an internal or external non-transitory CRM 352. The processor resources 350-1, 350-2, ..., 350-N can execute CRI 354 to perform various functions. For example, the processor resources 350-1, 350-2, ..., 350-N can execute CRI 354 to perform a number of functions (e.g., generating a node coverage map based on the received communication metrics, etc.). A non-transitory CRM (e.g., CRM 352), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), as well as other types of computer-readable media.

The non-transitory CRM 352 can also include distributed storage media. For example, the CRM 352 can be distributed among various locations.

The non-transitory CRM 352 can be integral, or communicatively coupled, to a computing device, in a wired and/or a wireless manner. For example, the non-transitory CRM 352 can be an internal memory, a portable memory, a portable disk, or a memory associated with another computing resource (e.g., enabling CRIs to be transferred and/or executed across a network such as the Internet).

The CRM 352 can be in communication with the processor resources 350-1, 350-2, ..., 350-N via a communication path 356. The communication path 356 can be local or remote to a machine (e.g., a computer) associated with the processor resources 350-1, 350-2, ..., 350-N. Examples of a local communication path 356 can include an electronic bus internal to a machine (e.g., a computer) where the CRM 352 is one of volatile, non-volatile, fixed, and/or removable storage medium in communication with the processor resources 350-1, 350-2, ..., 350-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 356 can be such that the CRM 352 is remote from the processor resources e.g., 350-1, 350-2, ..., 350-N, such as in a network relationship between the CRM 352 and the processor resources (e.g., 350-1, 350-2, ..., 350-N). That is, the communication path 356 can be a network relationship. Examples of such a network relationship can include a local area network (LAN), wide area network (WAN), personal area network (PAN), and the Internet, among others. In such examples, the CRM 352 can be associated with a first computing device and the processor resources 350-1, 350-2, ..., 350-N can be associated with a second computing device (e.g., a Java® server).

As described herein, a "module" can include computer readable instructions (e.g., CRI 354) that can be executed by a processor to perform a particular function. A module can also include hardware, firmware, and/or logic that can perform a particular function.

As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A wireless network site survey system, comprising:
a root access point;
a plurality of wireless nodes movable from a first area positioned on a first side of the root access point to a second area positioned on a second side of the root access point, wherein the plurality of wireless nodes are movable routers configured to send and receive a number of beacon messages; and
a computing device configured to:
 receive communication metrics from the root access point and the plurality of wireless nodes at the first area during a first time period;
 receive communication metrics from the root access point and the plurality of wireless nodes at the second area during a second time period, wherein the communication metrics include metrics of communication between the plurality of wireless nodes, the root access, and the computing device;
 determine projected communication metrics for a projected communication path between the first area and the second area when the plurality of wireless nodes are positioned at the second area; and
 generate a node coverage map for the first area and the second area based on the received communication metrics and the determined projected communication metrics.

2. The system of claim 1, wherein the computing device is configured to determine a link quality between each of the plurality of wireless nodes.

3. The system of claim 1, wherein the computing device determines link quality metrics for a projected communication path between one or more of the plurality of wireless nodes at second first area and the plurality of wireless nodes previously located at the first area.

4. The system of claim 1, wherein the root access point is stationary at a particular location and the remaining plurality of wireless nodes are each movable from the first location to the second location.

5. The system of claim 4, wherein the first location and the second location are within a communication threshold of the root access point.

6. The system of claim 1, wherein the computing device is a remote computing device to receive a number of beacon messages from the plurality of wireless nodes at the first location and at the second location when the plurality of wireless nodes are moved to the second location.

7. A method for wireless network site surveying, comprising:
placing a number of wireless nodes at a first set of locations, wherein the number of wireless nodes are movable routers configured to send and receive a number of beacon messages;
placing a root access point at a particular location in communication with at least one of the number of wireless nodes;
receiving communication metrics from the number of wireless nodes at the first set of locations and the root access point during a first time period;
moving the number of wireless nodes to a second set of locations that is in communication with the root access point at the particular location;
receiving communication metrics from the number of wireless nodes at the second set of locations and the root access point during a second time period;
determining projected link quality metrics for a projected communication path between the number of wireless nodes that were previously located at the first set of locations and the number of wireless nodes at the second set of locations; and
generating a node coverage map based on the received communication metrics, wherein the node coverage map includes the first and second set of locations.

8. The method of claim 7, wherein moving the number of wireless nodes includes creating a leap frog over the root access point.

9. The method of claim 7, comprising determining communication metrics between a first wireless node from the first set of locations and a second wireless node from the second set of locations.

10. The method of claim 9, wherein determining communication metrics includes moving a particular wireless node from a first location to a second location and determining the communication metrics between the first location and the second location.

11. The method of claim 7 comprising selecting a number of locations for receiving the communication metrics.

12. The method of claim 7, comprising determining a connectivity between each of the plurality of wireless nodes.

13. A wireless network site survey system, comprising:
a plurality of wireless nodes placed at a first location at a first time and moved to a second location at a second time within a designated area to send a number of beacon messages to each of the other wireless nodes within the designated area and to a computing device, wherein the plurality of wireless nodes are movable routers configured to send and receive a number of beacon messages;
a root access node placed a particular location within the designated area to send and receive a number of beacon messages from the plurality of wireless nodes placed at the first location and from the plurality of wireless nodes when the plurality of wireless nodes are moved to the second location; and
the computing device configured to:
 determine link quality metrics by analyzing received beacon messages from the plurality of wireless nodes at the first location and the second location;
 determine projected link quality metrics for a projected communication path between one or more of the plurality of wireless nodes previously located at the first location and one or more of the plurality of wireless nodes at the second location when one or more of the plurality of wireless nodes are moved from the first location to the second location; and
 generate a node coverage map based on the link quality metrics.

14. The system of claim 13, wherein the computing is configured to create a virtual topology of a number of wireless nodes based on the link quality metrics at the first location and the second location.

15. The system of claim 13, wherein the node coverage map includes a heat map of the designated area.

16. The system of claim 13, wherein the computing device can simulate communication metrics between two wireless nodes based on the determined communication metrics.

17. The system of claim 16, wherein simulating communication metrics includes simulating communication between a physical wireless node at the second location and a non-physical wireless node previously located at the first location.

18. The system of claim 13, wherein the root node is a stationary node when moving the number of wireless nodes to a second number of locations.

19. The system of claim 18, wherein the node coverage map is generated prior to a wireless network installation.

20. The system of claim 13, wherein the number of beacon messages are sent periodically over a fixed channel.

* * * * *